(12) United States Patent
Ashdown

(10) Patent No.: US 9,078,299 B2
(45) Date of Patent: Jul. 7, 2015

(54) PREDICTIVE DAYLIGHT HARVESTING SYSTEM

(75) Inventor: Ian Ashdown, West Vancouver (CA)

(73) Assignee: SUNTRACKER TECHNOLOGIES LTD, Victoria (CA)

( * ) Notice: Subject to any disclaimer, the term of this patent is extended or adjusted under 35 U.S.C. 154(b) by 484 days.

(21) Appl. No.: 13/446,577

(22) Filed: Apr. 13, 2012

(65) Prior Publication Data

US 2012/0265350 A1 Oct. 18, 2012

Related U.S. Application Data

(60) Provisional application No. 61/457,509, filed on Apr. 14, 2011, provisional application No. 61/565,195, filed on Nov. 30, 2011.

(51) Int. Cl.
*G05B 13/00* (2006.01)
*H05B 37/00* (2006.01)
*F24F 11/00* (2006.01)

(52) U.S. Cl.
CPC ............ *H05B 37/00* (2013.01); *F24F 11/0034* (2013.01); *F24F 2011/0049* (2013.01); *F24F 2011/0094* (2013.01); *Y02E 10/40* (2013.01)

(58) Field of Classification Search
USPC ............................ 700/276; 315/318; 340/469
See application file for complete search history.

(56) References Cited

U.S. PATENT DOCUMENTS

| | | |
|---|---|---|
| 4,928,250 A | 5/1990 | Greenberg |
| 5,058,042 A | 10/1991 | Hanna |
| 5,313,568 A | 5/1994 | Wallace |
| 5,369,738 A | 11/1994 | Bremner, III |
| 5,546,327 A | 8/1996 | Hattori |
| 5,546,515 A | 8/1996 | Mochizuki |
| 5,668,446 A | 9/1997 | Baker |
| 5,734,385 A | 3/1998 | Mima |
| 5,923,331 A | 7/1999 | Dusseux |
| 5,936,633 A | 8/1999 | Aono |
| 6,262,742 B1 | 7/2001 | Tampieri |
| 6,313,842 B1 | 11/2001 | Tampieri |
| 6,366,283 B1 | 4/2002 | Tampieri |
| 6,411,297 B1 | 6/2002 | Tampieri |
| 6,441,820 B2 | 8/2002 | Prater |
| 6,487,322 B1 | 11/2002 | Bastos |
| 6,496,597 B1 | 12/2002 | Tampieri |
| 6,525,730 B2 | 2/2003 | Tampieri |
| 6,567,083 B1 | 5/2003 | Baum |
| 6,753,859 B1 | 6/2004 | Segal |

(Continued)

OTHER PUBLICATIONS

Ashdown, I; Radiosity: A Programmer's Perspective; book; 1994; John Wiley & Sons; United States.

(Continued)

*Primary Examiner* — Robert Fennema
*Assistant Examiner* — Anthony Whittington
(74) *Attorney, Agent, or Firm* — Michael J. Andri

(57) ABSTRACT

In the context of a predictive daylight harvesting system data values are input regarding a plurality of variable building design parameters. The effects on a building's environmental characteristics are calculated based on the data values regarding a plurality of building design parameters. At least one of the data values is changed regarding variable building design parameters. The effects on a building's environmental characteristics are recalculated based on the data values regarding a plurality of building design parameters building heat balance.

8 Claims, 5 Drawing Sheets

(56) References Cited

U.S. PATENT DOCUMENTS

| | | | |
|---|---|---|---|
| 7,019,276 B2 | 3/2006 | Cloutier | |
| 7,045,968 B1 | 5/2006 | Bierman | |
| 7,333,903 B2 | 2/2008 | Walters | |
| 7,501,774 B2 | 3/2009 | Hick | |
| 7,545,101 B2 | 6/2009 | Hick | |
| 7,546,167 B2 | 6/2009 | Walters | |
| 7,546,168 B2 | 6/2009 | Walters | |
| 7,603,184 B2 | 10/2009 | Walters | |
| 7,608,807 B2 | 10/2009 | Hick | |
| 7,683,301 B2 | 3/2010 | Papamichael | |
| 7,761,260 B2 | 7/2010 | Walters | |
| 7,781,713 B2 | 8/2010 | Papamichael | |
| 7,911,359 B2 | 3/2011 | Walters | |
| 8,010,319 B2 | 8/2011 | Walters | |
| 8,110,994 B2 | 2/2012 | Hick | |
| 8,138,690 B2 * | 3/2012 | Chemel et al. | 315/318 |
| 2005/0041024 A1 | 2/2005 | Green | |
| 2008/0007394 A1 * | 1/2008 | Roberts | 340/469 |
| 2010/0006749 A1 * | 1/2010 | Hick et al. | 250/252.1 |
| 2010/0259931 A1 * | 10/2010 | Chemel et al. | 362/249.02 |
| 2010/0262296 A1 * | 10/2010 | Davis et al. | 700/275 |
| 2010/0262297 A1 * | 10/2010 | Shloush et al. | 700/276 |
| 2010/0289412 A1 * | 11/2010 | Middleton-White et al. | 315/152 |

OTHER PUBLICATIONS

Ashdown, I; "Modeling Daylight for Interior Environments"; symposium; Nov. 5-6, 2004; IESANZ Annual Conference Proceedings; Illuminating Engineering Society of Australia and New Zealand; Broadbeach, Queensland, Australia.

* cited by examiner

PREDICTIVE DAYLIGHT HARVESTING SYSTEM

CROSS-REFERENCE TO RELATED APPLICATION

The present application claims priority to U.S. Provisional Patent Application Ser. No. 61/457,509, titled PREDICTIVE DAYLIGHT HARVESTING METHOD AND APPARATUS, filed Apr. 14, 2011, the entire contents of which are incorporated herein by reference in their entirety for all purposes. The present application also claims priority to U.S. Provisional Patent Application Ser. No. 61/565,195, titled PREDICTIVE DAYLIGHT HARVESTING METHOD AND APPARATUS, filed Nov. 30, 2011, the entire contents of which are incorporated herein by reference in their entirety for all purposes.

TECHNICAL FIELD

The subject matter of the present invention relates to the field of sustainable building lighting and energy control, and more particularly, is concerned with a method and apparatus for predictive daylight harvesting.

BACKGROUND

Electric lighting accounts for approximately 40 percent of all energy consumed in modern buildings. It has long been recognized that incorporating available daylight can reduce these annual energy costs by 40 to 50 percent using "daylight harvesting" techniques. The basic principle of daylight harvesting is to monitor the amount of daylight entering an interior space and dim the electric lighting as required to maintain a comfortable luminous environment for the occupants. Where required, motorized blinds and electrochromic windows may also be employed to limit the amount of daylight entering the occupied spaces. Further energy savings can be realized through the use of occupancy sensors and personal lighting controls that operate in concert with the daylight harvesting system and are therefore considered integral thereto.

SUMMARY

As a non-limiting example, the present invention provides a predictive daylight harvesting system which can be implemented as a method comprising the steps of: a) inputting data values regarding a plurality of variable building design parameters; b) calculating the effects on a building's environmental characteristics based on the data values regarding a plurality of building design parameters; c) changing at least one of the data values regarding variable building design parameters; d) recalculating the effects on a building's environmental characteristics based on the data values regarding a plurality of building design parameters.

The parameters may be used to control any building environmental system including lighting, heating, humidity or all of them together. This enables the selection of building design parameter settings to maximize energy savings while maintaining selected minimal occupant requirements, for example, for heating, lighting, and/or humidity. Daylight harvesting is well suited to lighting control and to a lesser extent heating control, but the system is not limited to that prime example of a use for the system.

Solar insolation is not necessarily a parameter to be used in the system, but it is a prime parameter to be considered in building design. In practice it would be preferred to include the steps of: a) measuring actual solar insolation and fine-tuning selected building design parameter settings to maximize energy savings while maintaining selected minimal occupant requirements for heating and lighting; b) analyzing a combination of historical weather data, in situ daylight measurements over time, and current weather predictions, and determining an optimal strategy for predictive daylight harvesting that maximizes energy savings while maintaining selected minimal occupant requirements for heating and lighting; c) analyzing occupant behaviour, based on input from occupancy event sensors and personal lighting controls actions, and determining an optimal strategy for daylight harvesting that maximizes energy savings while maintaining selected minimal occupant requirements for heating and lighting, based on predicted occupant behaviour; d) interacting with a building's HVAC control system and implementing an optimal strategy for maximizing energy savings while maintaining selected minimal occupant requirements for heating and lighting.

The variable building design parameters would include artificial light locations and illumination levels, thermal emissivity and thermal mass of objects and surfaces in a building's interior environment for the purpose of determining radiative heat transfer within the environment due to solar insolation.

As another non-limiting example, in a basic implementation, the predictive daylight harvesting method would have the following steps: a) receiving input data from at least one ambient condition sensor and at least one information feed about anticipated solar conditions; b) calculating a luminous environment for a building based on the input data; c) generating messages based on output data about the calculated luminous environment; d) transmitting the messages via an interconnect system to a building environmental control subsystem; in order to maximize energy savings while maintaining selected minimal occupant requirements for a building's environmental characteristics.

As yet another non-limiting example, the predictive daylight harvesting system can be implemented as an apparatus having a controller that: a) reads input data from a variety of sensors and information feeds, the sensors and feeds to include at least a plurality of sensors and information feeds from among the class of sensors and information feeds that includes daylight photosensors, occupancy sensors, timers, personal lighting controls, utility power meters, weather report feeds, HVAC and energy storage controllers; b) calculates the effects of variable building design parameters on building environment characteristics, such as light, heat, and humidity balance and on energy management, and c) outputs building design parameter setting command signals in order to maximize energy savings while maintaining selected minimal occupant requirements for the building environment characteristics. The controller would read input data from a variety of sensors and information feeds, including but not limited to daylight photosensors, occupancy sensors, timers, personal lighting controls, utility power meters, weather report feeds, and other energy management systems, including HVAC and energy storage controllers. The controller would receive and process information about light fixtures and light sources (luminaires) located in a building's interior environment, including photometric and electrical properties of the luminaires.

The system would be enhanced by having the controller maintain and access virtual representations of a building's exterior and interior environments, including the geometry and material properties of objects that may significantly influence the distribution of daylight and artificial (for example, electrically-generated) luminous flux within the environments, such as luminaires located in the interior environment, including their photometric and electrical properties, daylight photosensors located in the interior and optionally exterior environments, and occupancy sensors located in the interior environment. These virtual representations of building exterior and interior environments would be accessed by the controller to perform calculations on the effects of solar insolation on building heat balance and energy management. Specifically, virtual representations of thermal emissivity and heat capacity (thermal mass) of objects and surfaces in a building's interior environment, would accessed by the controller for the purpose of determining radiative heat transfer within the environment due to solar insolation. Additionally, virtual representations of occupants and their behaviours, including where the occupants are likely to be located within a building's interior environments at any given time and date, and the occupants' personal lighting preferences, would be accessed by the controller for the purpose of calculating optimal output setting for building design parameter setting command signals in order to maximize energy savings while maintaining selected minimal occupant requirements for heating and lighting.

Optimally, the system would include a fuzzy-logic inference engine that learns weather patterns and occupant usage patterns and preferences, and the controller would maintain a mathematical model of sky conditions, historical weather data, and a database of weather patterns and occupant usage patterns and preferences, continually reads data from external input and communication devices, calculates the optimal settings for luminaires and fenestration devices, and controls luminaires and fenestration devices to achieve maximal energy savings while providing an interior luminous environment that is consistent with predefined goals and occupant preferences.

In one elementary form, the predictive daylight harvesting system would also comprise: a) at least one controller that reads input data from a variety of sensors and information feeds, and that includes an artificial intelligence engine; b) at least one ambient condition sensor and at least one information feed; c) an interconnect system operatively coupling the controller to the sensor and the information feed; configured to provide output data suitable for dimming or switching luminaires and operating automated fenestration devices.

The controller may further maintain communication with other building automation subsystems, including but not limited to HVAC and energy storage systems. It may also maintain communication with external systems such as electrical power utilities and smart power grids.

In a preferred mode of operation, the controller would continually read data from the external input and communication devices, calculate the optimal settings for the luminaires and fenestration devices, and control those devices to achieve maximal annual energy savings while providing an interior luminous environment that is consistent with predefined goals and occupant preferences. The "what-if" scenarios capability of the invention deriving from its simulating a virtual building interior environment on a regular basis (for example, hourly) enable a physical daylight harvesting controller system to be designed (for example, including an optimal layout of daylight photosensors) and programmed accordingly. The controller can then further access the virtual representation during operation to refine its behavior in response to the building performance by means of "what-if" simulations.

The disclosed and/or claimed subject matter is not limited by this summary as other examples and/or limitations may be described by the following written description and associated drawings.

DETAILED DESCRIPTION

Figure 1:
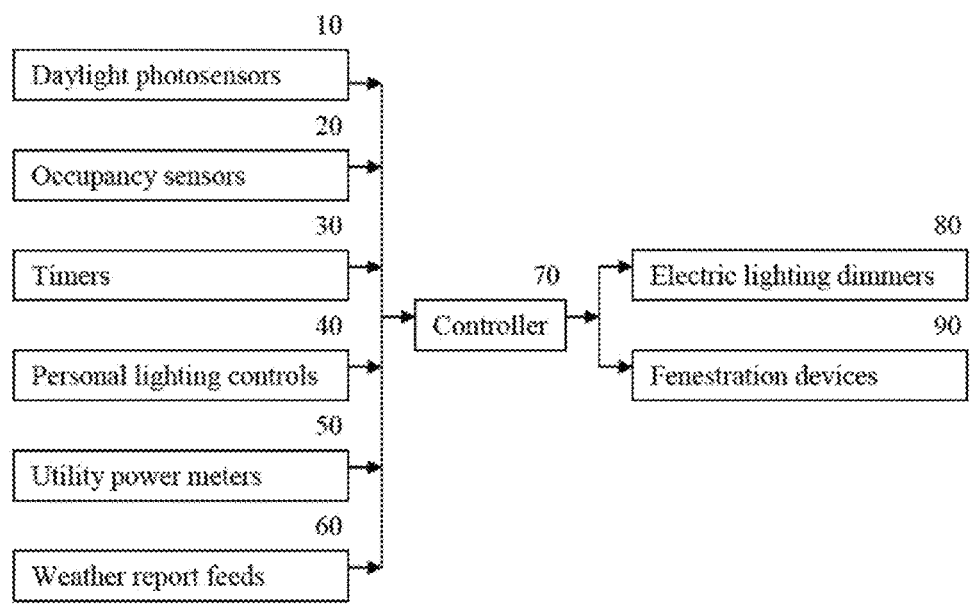
FIG. 1 shows a block diagram of the predictive daylight harvesting system.

The present invention is herein described more fully with reference to the accompanying drawings, in which embodiments of the invention are shown. This invention may, however, be embodied in many different forms, and should not be construed as limited to the embodiments described herein. Rather, these embodiments are provided so that this disclosure will be thorough and complete, and will fully convey the scope of the invention to those skilled in the art.

As used in the present disclosure, the term "diffuse horizontal irradiance" refers to that part of solar radiation which reaches the Earth as a result of being scattered by the air molecules, aerosol particles, cloud particle, or other airborne particle, and which is incident an unobstructed horizontal surface, the term "direct normal irradiance" refers to solar radiation received directly from the Sun on a plane perpendicular to the solar rays at the Earth's surface, the term "solar insolation" refers to the solar radiation on a given surface, and the terms "illuminance," "irradiance," "luminous exitance," "luminous flux," "luminous intensity," "luminance," "spectral radiant flux," "spectral radiant exitance," and "spectral radiance" are commonly known to those skilled in the art and as defined in ANSI/IES RP-16-10, Nomenclature and Definitions for Illuminating Engineering.

Electric lighting accounts for approximately 40 percent of all energy consumed in modern buildings. It has long been recognized that incorporating available daylight can reduce these annual energy costs by 40 to 50 percent using "daylight harvesting" techniques.

The basic principle of daylight harvesting is to monitor the amount of daylight entering an interior space and dim the electric lighting as required to maintain a comfortable luminous environment for the occupants. Where required, motorized blinds and electrochromic windows may also be employed to limit the amount of daylight entering the occupied spaces.

Further energy savings can be realized through the use of occupancy sensors and personal lighting controls that operate in concert with the daylight harvesting system and are therefore considered integral thereto. At the same time, the building occupants' comfort and productivity must be taken into consideration by for example limiting visual glare due to direct sunlight.

Daylight harvesting is also related to solar insolation management in that the infrared solar irradiation entering interior spaces is absorbed by the floors, walls and furniture as thermal energy. This influences the building heat balance that must be considered in the design and operation of heating, ventilation and air conditioning (HVAC) systems. For example, the energy savings provided by electric light dimming may need to be balanced against the increased costs of HVAC system operation.

Related to solar insolation management is the design and operation of solar energy storage systems for high performance "green" buildings, wherein thermal energy is accumulated by means of solar collectors and stored in insulated tanks for later use in space heating. The decision of whether to store the thermal energy or use it immediately is dependent in part on daylight harvesting through the operation of motorized blinds and other active shading devices that affect solar insolation of interior surfaces.

The operation of such systems may therefore benefit from weather data and other information that is shared by the daylight harvesting system. More generally, the design and operation of a daylight harvesting system is advantageously considered a component of an overall building automation system that is responsible for energy usage and conservation.

Annual lighting energy savings of 40 to 50 percent are possible with well-designed electric lighting systems incorporating daylight harvesting, even as standalone controllers that function independently of the HVAC systems. However, it has also been shown that roughly half of all installed daylight harvesting systems do not work as designed. These systems do not provide significant energy savings, and in many cases have been physically disabled by the building owners due to unsatisfactory performance.

The underlying problem is that the performance of these systems is determined by many parameters, including lamp dimming (continuous versus bi-level switched), photosensor placement and orientation, photosensor spatial and spectral sensitivity, luminaire zones, timer schedules, occupancy sensors, interior finishes, window transmittances, exterior and interior light shelves, motorized blinds and other shading devices, and personal lighting controls. In addition, the presence of exterior occluding objects such as other buildings, large trees and surrounding geography need to be considered, as do the hour-by-hour weather conditions for the building site.

Given all this, there are at present no suitable design tools for the architect or lighting designer to simulate the performance of such complex systems. In particular, the current state-of-the-art in lighting design and analysis software requires ten of minutes to hours of computer time to simulate a single office space for a given time, date, and geographic location. Architects and lighting designers have no choice but to calculate the lighting conditions at noon on the winter and summer solstices and spring and fall equinoxes, then attempt to estimate the performance of their daylight harvesting designs for the entire year based solely on this limited and sparse information.

Existing daylight harvesting systems are therefore designed according to basic rules of thumb, such as "locate the photosensor away from direct sunlight" and "dim the two rows of luminaires closest to the south-facing windows." There is no means or opportunity to quantify how the system will perform when installed.

There are software tools for building HVAC systems design that take solar insolation into account, but they do so in the absence of design information concerning daylight harvesting and electric lighting. The mechanical engineer typically has to assume so many watts per unit area of electric lighting and design to worst-case conditions, with no consideration for energy savings due to daylight harvesting.

Once the daylight harvesting system has been installed, it must be commissioned. This typically involves a technician visiting the building site once on a clear day and once at night to calibrate the photosensor responses. This is mostly to ensure that the system is working, as there is no means or opportunity to adjust the feedback loop parameters between the photosensors and the dimmable luminaires for optimum performance. Indeed, many existing daylight harvesting systems operate in open loop mode without any feedback, mostly for the sake of design simplicity.

There is therefore a need for a method and apparatus to accomplish five related tasks: First, there is a need for a method whereby an architect or lighting designers can fully and interactively simulate the performance of a daylight harvesting design. That is, the method should account for multiple system parameters that may influence the system performance, including the effects of solar insolation on building heat balance and energy management. The method should simulate the overall system such that an hour-by-hour simulation for an entire year can be generated in at most a few minutes. Given this interactive approach, an architect or lighting designer can experiment with many different designs or variations on a design in order to determine which design maximizes annual building energy savings while respecting building occupants' comfort requirements.

Second, there is a need for an apparatus that uses the aforesaid method to physically implement the simulated system, and which has the ability to self-tune its initial parameters (as determined by the simulation) in order to maximize annual energy savings.

Third, there is a need for an apparatus that can analyze a combination of historical weather data, in situ daylight measurements over time, current weather predictions, and other information using the aforesaid method to autonomously determine an optimal strategy for predictive daylight harvesting that maximizes annual energy savings.

Fourth, there is a need for an apparatus that can analyze occupant behaviour, including occupancy sensor events and personal lighting controls actions such as luminaire dimming and switching and setting of personal time schedules, to autonomously determine an optimal strategy for daylight harvesting that maximizes annual energy savings based on predicted occupant behaviour.

Fifth, there is a need for a daylight harvesting apparatus that can coordinate its operation with HVAC systems, solar energy storage systems, and other high performance "green" building technologies that are influenced by solar insolation for the purposes of maximizing annual energy savings and building occupants' comfort and productivity.

FIG. 1 shows an apparatus for enabling a predictive daylight harvesting system. As shown, it is logically, but not necessarily physically, configured into three components: 1) inputs 10 to 70; 2) controller 80, user interface 90 and communications port 100; and 3) outputs 110 and 120.

Inputs

Referring to FIG. 1, the inputs include daylight photosensors 10, occupancy or vacancy sensors 20, timers 30, personal lighting controls 40, utility power meters 50, weather report feeds 60, and optional temperature sensors 70.

For the purposes of this application, a photosensor 10 includes any electronic device that detects the presence of visible light, infrared radiation (IR), and/or ultraviolet (UV) radiation, including but not limited to photoconductive cells and phototransistors.

Similarly for the purposes of this application, an occupancy or vacancy sensor 20 includes any electronic device that is capable of detecting movement of people, including but not limited to pyroelectric infrared sensors, ultrasonic sensors, video cameras, RFID tags, and security access cards.

Commercial daylight photosensors 10 may feature user-selectable sensitivity ranges that may be specified in footcandles or lux. Additionally the photosensor may include a field of view which may be specified in degrees. For the purposes of the present invention the spatial distribution of the photosensor sensitivity within its field of view, the spectral responsivity of the photosensor in the visible, infrared and ultraviolet portion of the electromagnetic spectrum, and the transfer function of the electrical output from the photosensor are germane. These device characteristics enable the present invention to more accurately simulate their performance, though the exclusion of one or more of these parameters will not prevent the system from functioning.

Daylight photosensors may be positioned within an interior environment (such as the ceiling of an open office) such that they measure the average luminance of objects (such as floors and desktops) within their field of view. Positioning of the photosensors may be to locate the photosensor away from direct sunlight. However, so-called "dual-loop" photosensors as disclosed in U.S. Pat. Nos. 7,781,713 and 7,683,301 may be positioned in for example skywells and skylights to measure both the average luminance of objects below and the direct sunlight and diffuse daylight incident upon the photosensors from above.

An alternative is to locate a daylight photosensor in each luminaire. In this example, the luminaire may be dimmed according to how much ambient light is detected by its photosensor.

Commercial occupancy and vacancy sensors 20 may employ pyroelectric, ultrasonic, or optical detection technologies, or a combination thereof. It can be difficult to accurately characterize the performance of these devices in enclosed spaces, as they may be influenced by the thermal emissivity of building materials for reflected far-infrared radiation and the acoustic reflectance of building materials for reflected ultrasonic radiation. In the present invention, occupancy sensors work best according to line-of-sight operation within their environments and in accordance with their sensitivity in terms of detection distance. Other motion detection techniques may also be employed.

Timers 30 may be implemented as external devices that are electrically or wirelessly connected to the controller 80, or they may be implemented within the hardware and software of said controller and accessed through the controller's user interface 90.

Personal lighting controls 40 may be implemented as for example handheld infrared remote controls or software programs executed on a desktop computer, a laptop computer, a smartphone, a personal digital assistant, or other computing device with a user interface that can be electrically or wirelessly connected to the controller 80, including an Internet connection, on a permanent or temporary basis. The controls optionally enable the occupant or user to specify for example preferred illuminance levels in a specific area of the interior environment (such as for example a open-office cubicle or private office, to control selected motorized blinds or electrochromic windows, to influence (such as by example voting) the illuminance levels in a shared or common area of the interior environment, to specify minimum and maximum preferred illuminance levels, to specify the time rate of illumination level increase and decrease ("ramp rate" and "fade rate"), to specify time delays for occupancy sensor responses, and to specify individual time schedules.

Utility power meters 50 can provide real-time information on power consumption by buildings, in addition to information on variable power consumption rates that may change depending on the utility system load and policies. Such meters may be electrically or wirelessly connected to the controller 80, including an Internet connection.

Real-time weather report feeds 60 are widely available including on the Internet. These feeds can be connected to the controller 80 via a suitable electrical or wireless connection.

Geographic Information Systems (GIS) data available through various sources can additionally provide relevant environmental data, again using a feed connected to the controller 80 via a suitable electrical or wireless connection.

Temperature sensors 70 may be employed to measure room temperatures if such information is not available from an external HVAC controller or building automation system (not shown) in communication with the controller 80.

Controller

In an embodiment, the controller 80 is a standalone hardware device, advantageously manufactured to the standards of standalone industrial computers to ensure continuous and reliable operation. It can however be implemented as a module of a larger building automation system.

The controller may further comprise a user interface 90 and one or more communication ports 100 for communication with operators and external systems, including HVAC controllers, energy storage system controllers, building automation systems, and geographically remote devices and systems (not shown).

The operation of the controller 80 is as disclosed below following a description of the outputs.

Outputs

Referring to FIG. 1, controller 80 provides electrical signals to the dimmable or switchable luminaires 110 and optionally automated fenestration devices 120, such as for example motorized window blinds and electrochromic windows whose transmittance can be electrically controlled. Said electrical signals may include analog signals, such as for example the industry-standard 0-10 volt DC or 4-20 milliamp signals, and digital signals using a variety of proprietary and industry-standard protocols, such as DMX512 and DALI. The connections may be hard-wired using for example an RS-485 or derivative connection, an Ethernet connection, or a wireless connection, such as for example Bluetooth, Zigbee, 6LoWPAN, or EnOcean.

Controller Operation

Figure 2:
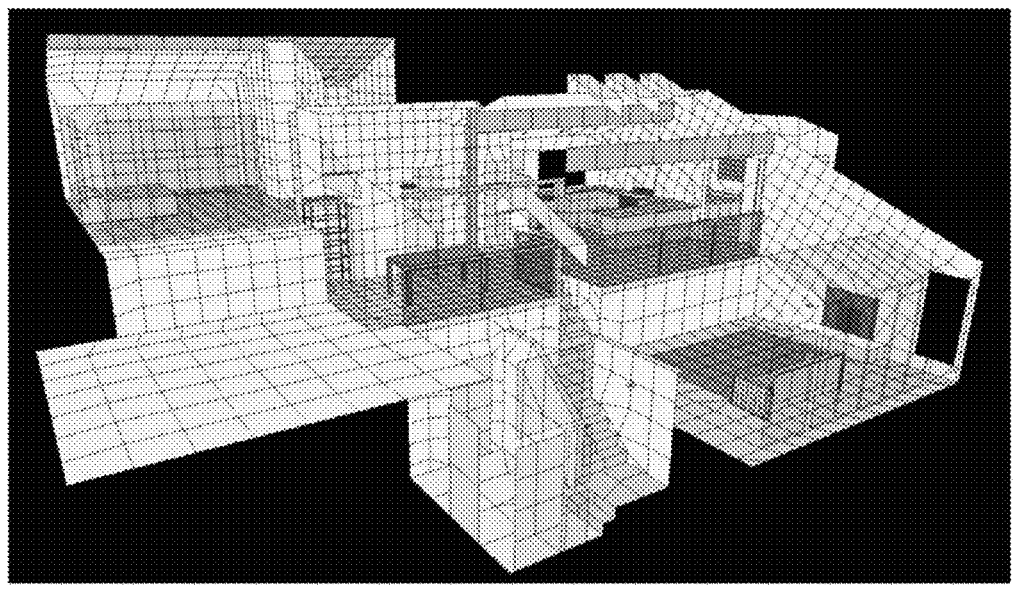
FIG. 2 shows an example of a finite element representation of a combined interior and exterior environment.

In one embodiment, the controller maintains or accesses a three-dimensional finite element representation of the exterior and interior environments, such as is shown for example in FIG. 2. The representation is comprised of a set of geometric surface elements with assigned surface properties such as reflectance, transmittance, and color, and one or more electric light sources ("luminaires") with assigned photometric data, such as luminous intensity distribution. For the purposes of solar insolation analysis, thermal emissivity and heat capacity properties may also be included.

Radiative flux transfer or ray tracing techniques can be used to predict the distribution of luminous flux or spectral radiant flux emitted by the luminaires within the interior environment due to interreflections between surface elements, as disclosed in for example U.S. Pat. No. 4,928,250.

An example of a commercial lighting design and analysis software products that employs such techniques is AGi32 as manufactured by Lighting Analysts Inc. (Littleton, Colo.). As disclosed by U.S. Pat. No. 4,928,250, said techniques apply to both visible and invisible radiation, including the distribution of infrared radiation due to solar insolation.

For daylighting analysis, the representation of the exterior environment may include other buildings and topographical features that may occlude direct sunlight and diffuse daylight from entering the windows and openings of the interior environment. Similarly, said buildings and topographical features may reflect direct sunlight and diffuse daylight into the interior environment via the windows and openings.

In a rural setting, for example, the site topography may be extracted from a geographic information system and represented as a set of finite elements. In an urban setting, the geometry and material properties of nearby buildings may be extracted from a series of photographs, such as are available for example from Google Street View.

Exterior Environments

For exterior environments, the light sources are direct solar irradiance and diffuse irradiance from the sky dome. Given the direct normal and diffuse horizontal irradiance measurements for a given time of day and Julian date, and the geographical position of the site in terms of longitude and latitude, the Perez Sky or similar mathematical model may be used to accurately estimate the distribution of sky luminance for any altitude and azimuth angles. The irradiance measurements may be made in situ or derived from historical weather data such as from the Typical Meteorological Year (TMY) database for the nearest geographic location. (Infrared direct normal and diffuse horizontal irradiance measurements are also often available.)

Using radiative flux transfer techniques, the distribution of luminous or spectral radiant flux due to direct sunlight and diffuse daylight within the exterior environment can be predicted. In an embodiment, the sky dome is divided into a multiplicity of horizontal bands with equal altitudinal increments. Each band is then divided into rectangular "patches" at regular azimuthal increments such that each patch has roughly equal area. An example of such a division that yields 145 patches is commonly referred to as the Tregenza sky dome division.

In one embodiment, spectral radiant flux is represented as three separate color bands that are identified as "red," "green," and "blue" in correspondence with their perceived colors, and is commonly practiced in the field of computer graphics. In another embodiment, more color bands may be employed. For example, the spectral responsivity of daylight photosensors may extend from near-ultraviolet to near-infrared wavelengths. It may therefore be advantageous to represent spectral radiant flux as for example 50 nanometer-wide color bands from 350 to 1200 nm. In yet another embodiment, a single radiant flux value may suffice, such as for example to represent near-infrared radiation for solar insolation analysis.

For greater accuracy in representing the sky dome luminance distribution, a sky dome division may alternately be chosen such that the differences between adjacent patch luminances are minimized. For example, the sun will traverse a 47-degree wide band of the sky dome over a period of one year. Smaller patches within this band may be employed to more accurately represent the sky dome luminance for any given time and Julian date.

According to prior art as implemented for example by AGi32, each sky dome patch represents an infinite-distance light source that illuminates the exterior environment with a parallel light beam whose altitudinal and azimuthal angles are determined by the patch center, and whose luminous intensity is determined by the Perez sky model. (Other sky models, such as the IES and CIE Standard General Sky, may also be employed to predict the skydome's spatial luminance distribution.) Once the luminous flux contributions from the direct sunlight and diffuse daylight have been calculated and summed, radiative flux transfer techniques such as those disclosed in U.S. Pat. No. 4,928,250 can be employed to calculate the distribution of luminous or spectral radiant flux due to interreflections between surface elements in the exterior environment.

As will be known to those skilled in the arts of thermal engineering or computer graphics, each surface element in the finite element representation is assigned a parameter representing the luminous or spectral radiant flux that it has received but not yet reflected and/or transmitted (the "unsent flux"), and another parameter representing its luminous or spectral radiant exitance. (Infrared radiant flux and exitance may also be considered without loss of generality.) At each iteration of the radiative flux transfer process, the unsent flux from a selected element is transferred to all other elements visible to that element. Depending on the reflectance and transmittance properties of each element, some of the flux it receives is reflected and/or transmitted; the remainder is absorbed. The flux that is not absorbed is added to both its unsent flux and luminous exitance parameters. The total amount of unsent flux thus decreases at each iteration, and so the radiative flux transfer process converges to a "radiosity" solution, wherein the luminous exitance or spectral radiant exitance of every surface element is known.

In a novel contribution of the present invention, this approach is extended by assigning a multiplicity of 'n' unsent flux parameters and 'n' luminous or spectral radiant exitance parameters to each exterior environment element, where 'n' is the number of divisions of the sky dome. Each sky dome patch 'i' is assigned unit luminance or spectral radiance, and its contribution to the luminous or spectral radiant flux of each exterior element is saved in its 'i'th unsent flux and luminous or spectral radiant exitance parameters.

Once the luminous or spectral radiant flux contributions from the diffuse daylight (but not direct sunlight) have been calculated, radiative flux transfer techniques can be employed to calculate the distribution of luminous or spectral radiant flux due to interreflections between surface elements in the exterior environment for each sky dome patch. The result is the generation of 'n' separate radiosity solutions for the exterior environment. Because the sky patch luminances were not considered, these are referred to as 'canonical' radiosity solutions.

A particular advantage of this approach is that approximately 95 percent of the computational time needed to calculate the distribution of luminous flux due to interreflections between surface elements is devoted to calculating the "form factors" (i.e., geometric visibility) between elements, as disclosed in U.S. Pat. No. 4,928,250. Thus, if the prior art approach requires 'x' amount of time to calculate a single radiosity solution, the present approach requires 'x'+'y' time, where 'y' is typically less than five percent. (The remainder of the computational time is consumed by other "housekeeping" activities related to manipulating the geometric and material data.)

Once the 'n' canonical radiosity solutions have been calculated, the radiosity solution for any sky luminance distribution can be calculated as a weighted sum of the canonical radiosity solutions, where the weights are the luminances of the associated sky dome patches as predicted by the chosen sky model. Such solutions may be calculated in milliseconds, as opposed to minutes to hours for prior art approaches.

The present invention employs an approach wherein the solar altitudinal and azimuthal angles are used to determine the altitudinal and azimuthal angles of the three closest sky patch centers. The radiosity solution for the direct sunlight is then calculated as the weighted sum of the three canonical radiosity solutions for these patches, with the weights being the luminous intensities of the direct sunlight at the respective altitudinal and azimuthal angles.

Transition

Figure 3:
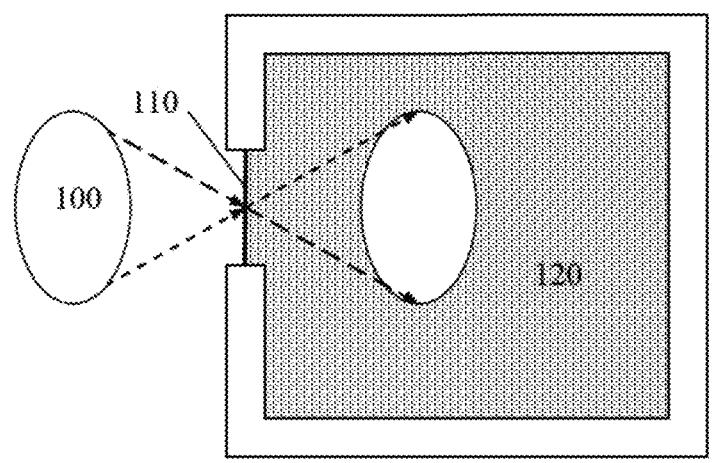
FIG. 3 shows the transfer of luminous flux from exterior environment elements through a window or opening to interior environment elements.

A serious disadvantage of representing diffuse daylight as 'n' separate infinite-distance light sources that emits parallel beams of light is that the discrete nature of the beams becomes evident when projected through small windows and openings separating the exterior environment from the interior environment (FIG. 3). These parallel beams tend to produce visible "spokes" of light patterns on the interior surfaces. Worse, they may contribute to serious errors in the subsequent radiative flux transfer calculations for the interior surface elements.

A prior art solution as implemented for example by AGi32 is to capture a virtual hemispherical ("fisheye") image of the exterior environment 300 as seen from the center of each window or opening 310 (referred to as a "transition" surface) or portion thereof. In a preferred embodiment, the method of capture utilizes a "hemicube" or similar geometric construct as disclosed in U.S. Pat. No. 4,928,250. This image is then projected from said center into the interior environment 320. Each pixel of the virtual image projects the average luminance or spectral radiant exitance of the exterior elements it represents onto the interior elements, thereby effecting radiative flux transfer. (A portion of the luminous flux or spectral radiant flux may be absorbed or reflected by a window surface.)

It is evident that each pixel of the virtual image represents a ray of luminous or spectral radiant flux emanating from the exterior environment that intersects the window or opening at the position of the virtual camera before transitioning into the interior environment. It is further evident that the angle of incidence q between said ray and the window surface normal can be precalculated. The reduction in transmitted flux (that is, the specular transmission coefficient) through a transparent window (glass, plastic, or more generally a dielectric material) due to Fresnel reflection can therefore be calculated on a per-pixel basis according to Schlick's approximation to the Fresnel equations:

$$T(q)=1-R(q)=(1-(R0+(1-R0)(1-\cos(q))**5)$$

where R0 is the surface reflectance at normal incidence (i.e., q=0), the Fortran operator "**" in the equation meaning "to the power of".

In cases where the dimensions of the window or opening are large with respect to the dimensions of the interior environment, it is advantageous to spatially divide the window or opening into a multiplicity of subareas called "patches," with the virtual camera (hemicube) positioned at the center of each patch.

A disadvantage of this approach is that the images project only luminous or spectral radiant flux. In order to project the luminous or spectral radiant flux distribution of the exterior environment into the interior environment for each of the 'n' canonical radiosity solutions, it would be necessary to repeat the transfer process 'n' times for each transition surface. This process involves calculating the form factors of all of the exterior and interior environment elements visible from the transition surface, which as previously noted is computationally very expensive.

The present invention avoids this computational expense by first assigning a unique identifier to every finite element in the exterior and interior environments, then transferring the exterior environment element identifiers associated with each pixel rather than their average luminance or spectral radiant exitance. When these pixels are "projected" onto the interior environment elements, it is possible to access the 'n' luminance or spectral radiant exitance values assigned to each exterior environment element through their assigned identifiers. In this manner, the 'n' radiosity solutions for the exterior environment can be transferred to the interior environment without any significant computational burden.

The above approach assumes that the windows are fully transparent. Recent advances in daylight control for high performance buildings have however introduced glazing systems with complex bidirectional scattering distribution functions (BSDFs), including light redirecting materials such as prismatic glass and plastics, holographic films, and Fresnel lens arrays.

To address such systems, it is noted that such glazing systems both redirect and scatter the incident flux. Thus, rather than simply projecting a captured virtual image into the interior environment, each pixel can be assigned a scattering distribution function that describes how an incident ray with given altitudinal and azimuthal angles corresponding to the pixel will be scattered. These functions can be compactly represented using spherical and hemispherical harmonics, wavelets, radial basis functions, and other two-dimensional signal compression techniques as will be known to those skilled in the art of image compression. The BSDF function coefficients may be measured or calculated from virtual representations of the glazing systems.

Interior Environment

For interior environments, the light sources are the direct sunlight, diffuse daylight, and reflected light from exterior environment elements transferred through the transition surfaces, plus the artificial light emitted by the luminaires.

For daylight harvesting purposes, one or more luminaires are typically be assigned to "zones" that can be independently dimmed or switched. For the purposes of illustration, there are assumed to be 'p' luminaire zones in interior environment, where 'p' may be less than or equal to the number of luminaires.

As with the exterior environment, the present invention assigns a multiplicity of 'n'+'p' unsent flux parameters and 'n'+'p' luminous or spectral radiant exitance parameters to each interior environment element, where 'n' is the number of divisions of the sky dome. Radiative flux transfer techniques can again be employed to calculate the distribution of luminous or spectral radiant flux due to interreflections between surface elements in the interior environment for each sky dome patch and each luminaire zone. (Similar to the sky patches, each luminaire zone is assigned unit luminous or spectral radiant intensity.) The result is the generation of 'n'+'p' separate canonical radiosity solutions for the interior environment.

In one embodiment, the set of radiosity solutions comprises a list of 'n' luminous exitance or spectral radiant exitance values for each exterior geometric element and 'n'+'p' luminous exitance or spectral radiant exitance values for each interior geometric element. In another embodiment, each such list is compressed using for example wavelet, radial basis function, or similar lossless or lossy signal compression techniques as will familiar to those skilled in the art of data communications. Further compression may be achieved through correlations between the exitance lists of geometrically adjacent or close elements, as will be familiar to those skilled in the art of multichannel data compression for electroencephalograms, electrocardiograms, and the like.

It is further noted that the number of finite elements 'm' representing an interior environment, each with an array 'n'+'p' of unsent flux and luminous exitance values, represents an 'm'×('n'+'p') array. This array can be compressed using for example two-dimensional singular value decomposition (SVD) or eigenvector techniques such as are used for image compression, and an approximate representation of a portion of the matrix reconstructed as required with limited memory.

Optimal Luminous Environment

It is important to note that while the calculation of the 'n' canonical radiosity solutions for the exterior environment and 'n'+'p' canonical radiosity solutions for the interior environment may require minutes to hours of computation time, these calculations need to be calculated only once for a given environment. Thereafter, the radiosity solution for any sky luminance distribution and any dimming or switched state for the luminaire zones can be calculated as a weighted sum of the canonical radiosity solutions, where the weights are the luminances of the associated sky dome patches and the luminous intensities of the luminaires for each zone. These calculations can be performed in milliseconds.

Figure 8:
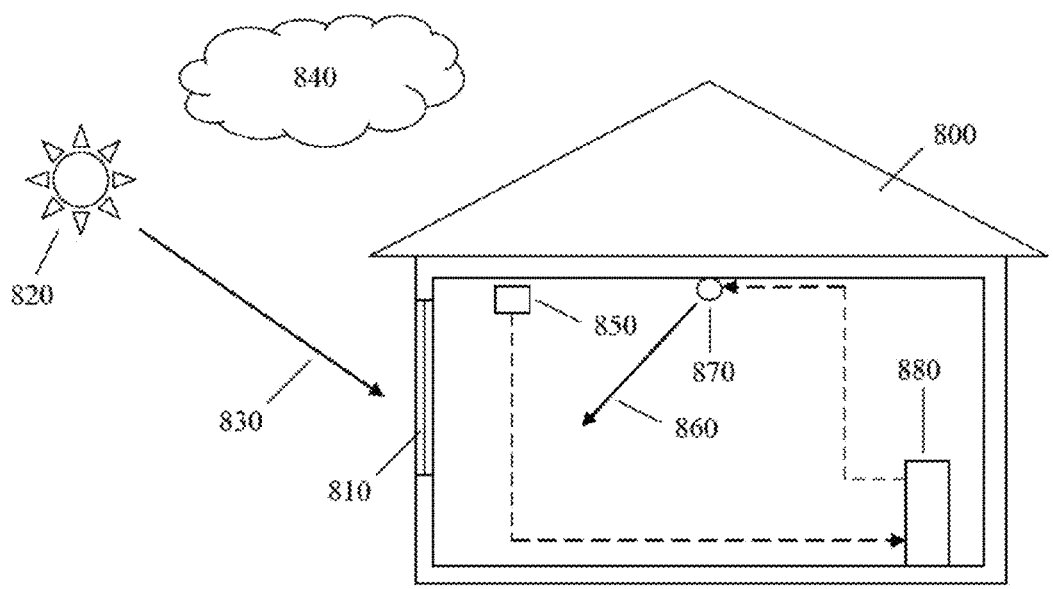
FIG. 8 shows a schematic representation of a daylighting harvesting system.

A "sky condition" is uniquely determined according to the Perez (or similar) sky model by the time of day, the Julian date, the geographical position of the site in terms of longitude and latitude, and the direct normal irradiance and diffuse horizontal irradiance, which determines the spatial distribution of sky luminance. For this sky condition, there will be a range of luminaire zone dimmer or switch settings and automated fenestration states that provide a comfortable luminous environment for the occupants of the interior environment and minimize energy consumption. FIG. 8 shows for example a building 800 with a window 810 that admits daylight 810 from the Sun 820 and sky, wherein the amount of daylight is determined by the weather 840. Daylight sensor 850 senses the amount of daylight entering the building and artificial light 860 received from electric light source 870 and communicates the information to controller 880, which subsequently adjusts the amount of artificial light.

These are often competing goals. Occupants will be interested in having relatively constant illuminance of their workplaces, minimal glare from the windows, and infrequent changes in the automated fenestration devices (especially motorized blinds). Minimizing energy consumption may however dictate frequent changes in workplace illuminance and fenestration devices, especially on partly cloudy days where the available daylight may change rapidly.

Figure 4:
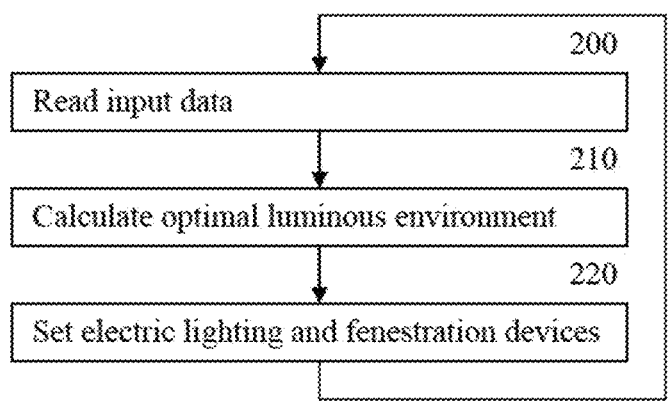
FIG. 4 shows a flowchart for operation of the predictive daylight harvesting system.

Assuming however that these competing goals can be satisfactorily resolved, the controller operation will be as shown in FIG. 4. In Step 400, the controller 80 reads the input devices 10 to 70 shown in FIG. 1. In Step 410, the controller 80 calculates an optimal luminous environment. This environment will be simulated by suitable weightings of the precalculated canonical radiosity solutions. In Step 420, the controller 80 sets the dimmers or switches the circuit of the luminaire zones (i.e., the electric lighting dimmers 110) and in accordance with the weights of the 'p' canonical radiosity solutions for the luminaire zones. Similarly, the settings of the automated fenestration devices are set in accordance with the average transmittance of the windows (i.e., the transition surfaces).

Figure 5:
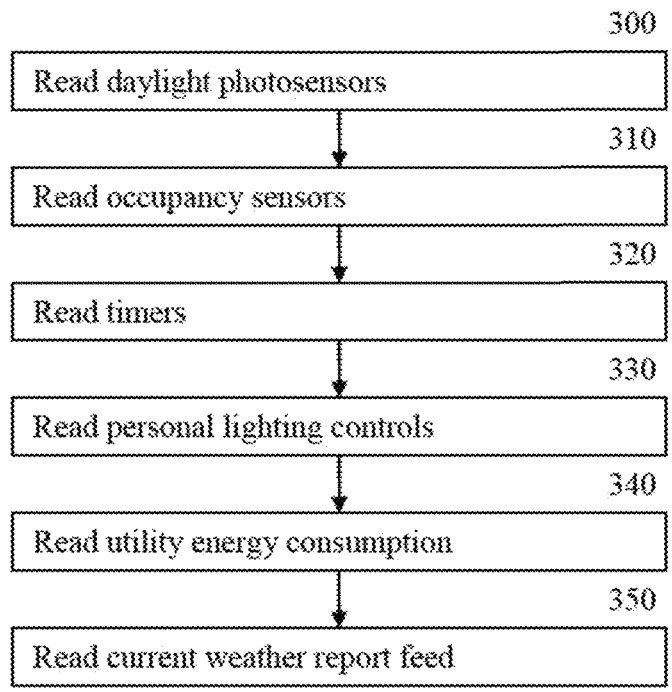
FIG. 5 shows a flowchart for reading the external input data.

FIG. 5 shows the process of reading the input devices in more detail, namely reading the daylight photosensors 10 (Step 500), reading the occupancy or vacancy sensors 20 (Step 510), reading the timers 30 (Step 520), reading the personal lighting controls 40 (Step 530), reading the utility power meters 50 (Step 540), reading the current weather report feed 60 (Step 550), and reading the temperature sensors 70 (Step 560) if present. Of course, the sequence shown in FIG. 5 is for illustration purposes only, and so is arbitrary.

Figure 6:
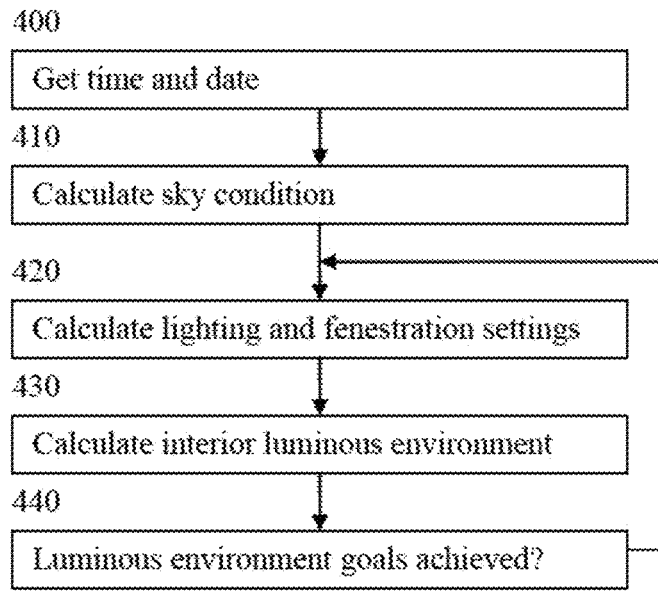
FIG. 6 shows a flowchart for calculating the optimal luminous environment.

FIG. 6 shows the process of simulating the interior luminous environment (i.e., the distribution of luminous exitance over the interior environment elements). In Step 600, the current time and date is determined. This uniquely determines the solar altitudinal and azimuthal angles. In Step 610, the current sky condition is determined from the direct normal irradiance and diffuse horizontal irradiance, which may be obtained for example from the weather report feed 60 in FIG. 1. It may also however be inferred from the daylight photosensor readings, as will be disclosed below.

The luminaire zone and automated fenestration settings are determined in Step 620. These settings will in general be constrained by the input devices data, including the daylight photosensors 10, occupancy sensors 20, timers 30, personal lighting controls 40, utility energy consumption 50, weather report feeds 60, and temperature sensors 70 of FIG. 1.

Further constraints may of course be imposed or implied by the requirements of external systems accessed through the communication ports 100, such as for example an HVAC system controller, an energy storage system controller, a building automation system, a smart power grid, and so forth.

The interior luminous environment is calculated in Step 630 using a weighted summation of the precalculated canonical radiosity solutions as previously disclosed.

The interior luminous environment is examined in Step 640 to determine whether the goals of a comfortable luminous environment for the occupants and the minimization of energy consumption have been attained. If not, Steps 620 through 640 are repeated.

Figure 7:
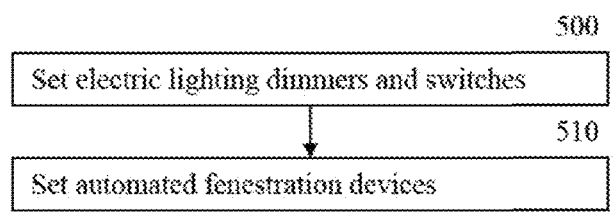
FIG. 7 shows a flowchart for controlling the electric lighting and automated fenestration devices.

FIG. 7 shows the output process of the controller 80, which consists of setting the luminaire zone dimmers and switches in Step 700 and setting the automated fenestration device states in Step 710. Not shown is communication with external systems with which the controller 80 may exchange information and commands.

Optimization

Referring to FIG. 1, the controller 80 comprises a neuro-fuzzy or similar logic inference engine that can be trained to generate optimal luminaire zone dimmer and switch settings and automated fenestration device states for any given sky condition or time sequence thereof to satisfy the goals of a comfortable luminous environment for the occupants and the minimization of annual energy consumption.

A key requirement of any logic inference engine is an input data set from which the engine can be trained to generate suitable outputs. Given the ability to quickly simulate the interior luminous environment using the radiosity-based method disclosed herein, suitable training data sets may include the Typical Meteorological Year (TMY) historical weather data files available for most geographic locations in North America (or equivalent weather data for other continents). These files provide hour-by-hour direct solar irradiance and diffuse irradiance values that can be used directly with the present invention.

As will be appreciated by those skilled in the art, there are many different artificial intelligence engines that can be trained to generate suitable output values for a range of input values; the neuro-fuzzy logic engine is merely one embodiment.

With the ability to train the controller 80 offline prior to deployment using a virtual representation of the environment, it becomes possible to design a daylight harvesting system with predictable energy savings performance. This includes the ability to locate and orient the daylight photosensors within the virtual interior environment such that the neuro-fuzzy logic engine can learn to correlate their outputs with known virtual sky conditions. When the controller is used with physical daylight photosensors within the physical interior environment, it is likely that the controller will be able to infer the correct sky condition strictly from the photosensor outputs without the need for direct normal and diffuse horizontal irradiance values from the weather report feed.

In one embodiment, the desired spatial illuminance distribution due to the combination of daylight and electric lighting across surfaces and workplanes in the virtual representation of the environment for each time and Julian date under various sky conditions is densely sampled with virtual photosensors spaced for example 30 centimeters on center. The predicted virtual photosensor outputs are arranged in a rectangular array. Using singular value decomposition (SVD) or eigenanalysis, the dominant singular vectors or eigenvectors of the array are determined. These vectors typically require much less storage space than the full matrix, and can later be used to reconstruct an approximation of the full matrix using for example truncated SVD for determining correlations between the virtual photosensor outputs and the spatial illuminance distributions.

In another embodiment, the virtual photosensor outputs are correlated directly with the dominant singular vectors or eigenvectors of the arrays, thereby eliminating the need to reconstruct approximations of the full matrices.

With multiple daylight photosensors 10, possibly mounted in each luminaire, it further becomes possible for the controller to perform data fusion by dynamically combining the photosensor outputs. That is, the controller may autonomously learn during its training with the TMY data set that a given weighting of photosensor outputs reliably predicts the correct sky condition during the morning, while another weighting is better during the afternoon. These weighted photosensor outputs can similarly be correlated with the corresponding spatial illuminance distributions or their corresponding dominant singular vectors or eigenvectors during the training period.

Once the controller 80 has been suitably trained, the three-dimensional finite element representation of the exterior and interior environments may optionally be removed from the controller memory, as it may be sufficient during operation of the controller to determine the most likely spatial illuminance distribution according to its correlation with the physical photosensor outputs. This eliminates the need to recalculate the spatial illuminance distribution in real time according to the photosensor outputs.

If on the other hand the three-dimensional finite element representation of the exterior and interior environments is retained in the controller memory or otherwise readily accessible to the controller, the radiative flux transfer can be iteratively recalculated with changes to the material reflectances, window transmittances, lamp lumen outputs, and other model parameters at regular intervals (for example, once per week) to improve the correlations between the predicted and measured photosensor outputs, or to suggest more appropriate positions and orientations for the physical photosensors.

Similarly, the controller may autonomously learn during its training with the TMY data set that the goals of a comfortable luminous environment for the occupants and the minimization of annual energy consumption are best satisfied with a dynamic configuration of luminaire zones. This may be particularly easy to accomplish if each luminaire is assigned an Internet address or other unique identifier such that a single dimming command can be sent to any number of luminaires.

Further, controller training need not be limited to the TMY or equivalent weather data set. As will be known to those skilled in the art, the controller can learn to adapt its behaviour to changes in the environment, such as changing user preferences for illumination or occupancy sensor events, or to changes in the requirements of external systems such as for example an HVAC controller or smart power grid.

In another embodiment, the three-dimensional finite element representation of the interior environment is augmented with virtual representation of occupants (for example, office workers) whose stochastic behavior includes movement within the environment to simulate occupancy sensor events, and whose user preferences dim or switch the luminaires at various locations (such as for example open office cubicles or workstations). These virtual occupants can be used to similarly train the controller offline prior to deployment, and to determine an optimal placement of occupancy sensors.

Following deployment, the controller can similarly record occupancy sensor events and personal lighting control operations to refine the stochastic behaviour of the virtual occupants.

During the controller training period, problems such as lamp failures, lamp lumen depreciation, photosensor and occupancy sensor failures, and network communication failures can be simulated, thereby enabling the controller to learn appropriate response strategies to minimize energy consumption, optimize spatial illuminance distributions, and satisfy other predetermined goals.

It will further be evident to those skilled in the art that neuro-fuzzy logic and similar artificial intelligence engines can be trained to recognize temporal patterns. In particular, the controller can implement a Kalman filter or other construct to observe a minute-by-minute sequence of sky conditions and predict the sky condition and occupant behaviour (as determined for example by the occupancy sensor outputs and personal lighting control commands) for some period of time into the future. Based on this ongoing sequence of predictions, it can develop a long-term strategy of daylight harvesting system settings that will satisfy the goals of occupant comfort and annual energy savings.

Finally, in yet another embodiment, the physical controller is simulated in software for the purposes of training during the design phase. The resultant data from the training period is then used to program the physical controller prior to deployment.

Controller Topology

In one embodiment, the controller 80 is implemented as centralized system. In another embodiment, the controller is implemented as a decentralized and self-organizing system with computational intelligence embedded in each luminaire and associated hardware devices connected via a bidirectional communications network.

The luminaire network topology may be based on swarm intelligence, such as for example particle swarm or ant colony optimization, where the goals are for example desired spatial illuminance distributions, minimal energy consumption, user preferences, minimal visual glare, and so forth.

Reinforcement learning algorithms can be employed to provide self-learning capabilities for the controller in achieving these goals. In one embodiment, the controller can simultaneously operate the physical daylight harvesting system in real time and model the environment offline using "what-if" scenarios to improve controller performance over time, wherein these scenarios may be implemented using evolutionary algorithms, including genetic algorithms.

Figure 9:
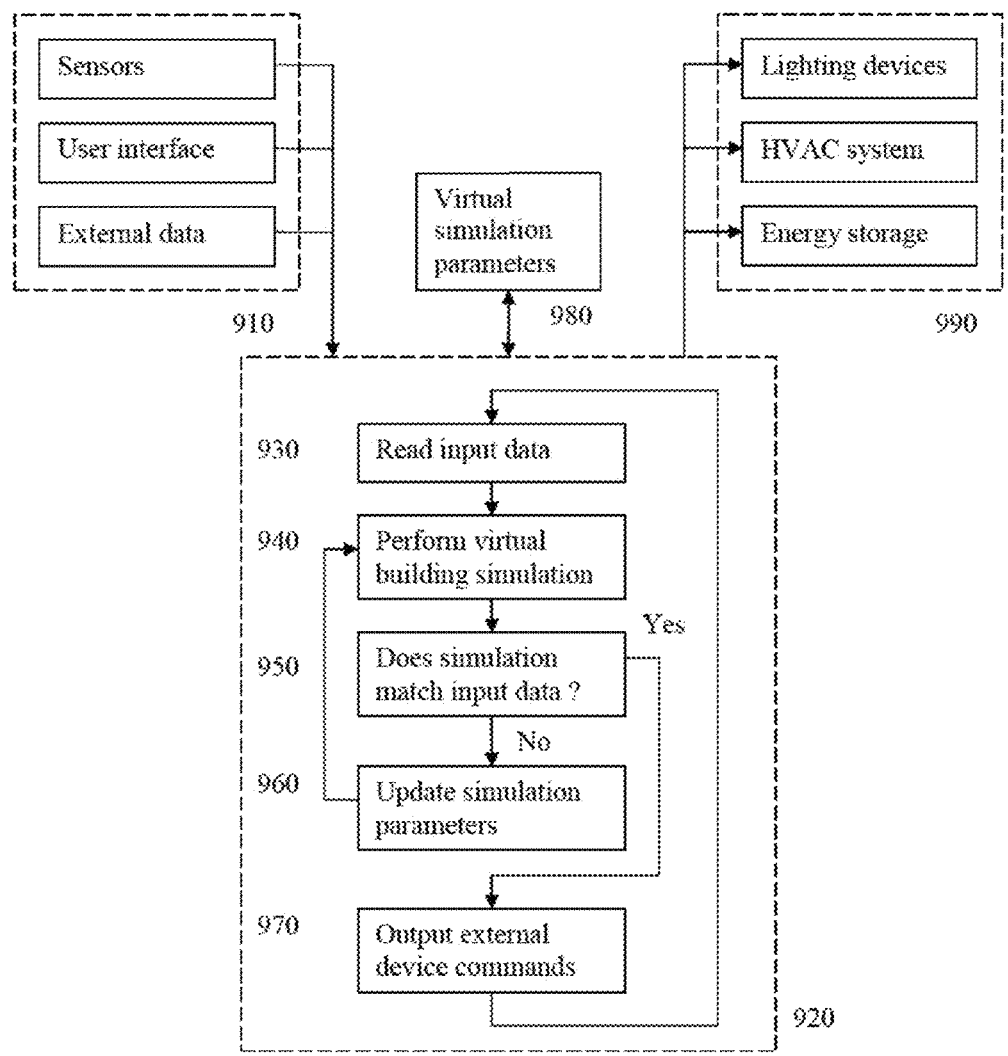
FIG. 9 shows a block diagram of a daylight harvesting system.

FIG. 9 shows a plurality of sensors and data feeds 910 providing real-time information to a controller 920. In Step 930, the controller reads the input data, then in Step 940 performs a virtual simulation of the building environment based on the virtual simulation parameters 980. The results of this simulation are compared with the predicted sensor data in Step 950. If the difference between the predicted and measured data exceeds predefined limits, the simulation parameters are updated and Steps 940 and 950 are repeated; otherwise Step 970 outputs commands to the external devices 990.

The embodiments of the invention may be varied in many ways. Such variations are not to be regarded as a departure from the spirit and scope of the invention, and all such modifications as would be obvious to one skilled in the art are intended to be included within the scope of the claims.

The invention claimed is:

1. A method performed by a predictive daylight harvesting system, the method comprising:
   receiving data values regarding a plurality of variable building lighting design parameters, including luminaire locations and illumination levels;
   calculating effects on a building's environmental characteristics based on the data values regarding the plurality of variable building lighting design parameters;
   changing at least one of the data values regarding the plurality of variable building lighting design parameters;
   selecting building lighting design parameter settings for the variable building lighting design parameters to maximize energy savings while maintaining selected occupant requirements for the building's environmental characteristics, including at least selected occupant requirements for lighting;
   measuring actual solar insolation and fine-tuning the selected building lighting design parameter settings to maximize energy savings while maintaining the selected occupant requirements for lighting;
   analyzing a combination of historical weather data, in situ daylight measurements over time and current weather predictions, and determining an optimal strategy for predictive daylight harvesting that maximizes energy savings while maintaining the selected occupant requirements for lighting;
   analyzing occupant behavior, based on input from occupancy event sensors and personal lighting controls actions, and further determining the optimal strategy for predictive daylight harvesting that maximizes energy savings while maintaining the selected occupant requirements for lighting based on predicted occupant behavior; and
   interacting with a building's lighting control system and implementing the optimal strategy for maximizing energy savings while maintaining the selected occupant requirements for lighting.

2. The method of claim 1, further comprising:
   receiving data values regarding a plurality of variable building thermal design parameters;
   recalculating the effects on the building's environmental characteristics based on the data values regarding the plurality of variable building thermal design parameters and the plurality of variable building lighting design parameters, the building's environmental characteristics further including selected occupant requirements for heating;
   fine-tuning the selected building thermal design parameter settings to maximize energy savings while maintaining the selected occupant requirements for heating and the selected occupant requirements for lighting;
   analyzing a combination of historical weather data, in situ daylight measurements over time and current weather predictions, and determining the optimal strategy for predictive daylight harvesting that maximizes energy savings while maintaining the selected occupant requirements for heating and the selected occupant requirements for lighting
   analyzing occupant behavior, based on input from occupancy event sensors and personal lighting controls actions, and determining the optimal strategy for daylight harvesting that maximizes energy savings while maintaining the selected occupant requirements for heating and the selected occupant requirements for lighting, based on predicted occupant behavior; and
   interacting with the building's HVAC control system and implementing the optimal strategy for maximizing energy savings while maintaining the selected occupant requirements for heating and the occupant requirements for lighting;
   in which the variable building thermal design parameters include thermal emissivity of surfaces, thermal mass of objects and room temperatures in the building's interior environment for the purpose of determining radiative heat transfer within the building's interior environment due to solar insolation.

3. A predictive daylight harvesting system, comprising:
   a controller that:
   reads input data from a plurality of sensors and information feeds, the sensors and information feeds including daylight photosensors, occupancy sensors, timers, personal lighting controls, weather report feeds, and energy storage controllers;
   calculates effects of variable building design parameters on a building's environmental characteristics, including at least selected occupant requirements for lighting;
   outputs controller command signals in order to maximize energy savings while maintaining selected occupant requirements for the building's environmental characteristics; and
   includes virtual representations of the building's exterior and interior environments, including geometry and material properties of objects that influence the distribution of daylight and artificial luminous flux within the exterior and interior environments, which virtual representations of the building's exterior and interior environments are accessed by the controller to perform calculations on effects of solar insolation on building energy management; and
   in which the controller receives and processes information about luminaires located in the building's interior environment, including photometric and electrical properties of the luminaires, and receives information from daylight photosensors and occupancy sensors located in the building's interior environment, and further comprising:
   virtual representations of occupants and their behaviors, including where the occupants are likely to be located within the building's interior environment at any given time and date, and the occupants' personal lighting preferences, which the virtual representations of the occupants and their behaviors are accessed by the controller for the purpose of calculating optimal output settings for the controller command signals in order to maximize energy savings while maintaining selected occupant requirements for lighting; and
   a fuzzy-logic inference engine that learns weather patterns and occupant usage patterns and preferences;

in which the controller maintains a mathematical model of sky conditions, historical weather data, and a database of weather patterns and occupant usage patterns and preferences, continually reads data from external input and communication devices, calculates the optimal settings for luminaires and fenestration devices, and controls luminaires and fenestration devices to achieve maximal enerqy savings while providing an interior luminous environment that is consistent with predefined goals and occupant preferences.

4. The predictive daylight harvesting system of claim 3, further comprising:

a controller that:

reads input data from a variety of sensors and information feeds, the sensors and feeds to include at least a plurality of sensors and information feeds from among the class of sensors and information feeds that includes utility power meters, weather report feeds, HVAC and energy storage controllers;

calculates the effects of variable building design parameters, on the building's environmental characteristics, further including selected occupant requirements for heating;

outputs controller command signals in order to maximize energy savings while maintaining selected occupant requirements for the building's environmental characteristics;

includes virtual representations of building exterior and interior environments, including geometry and material properties of objects that influence the distribution of daylight and artificial luminous flux within the environments, which virtual representations of building exterior and interior environments are accessed by the controller to perform calculations on the effects of solar insolation on building heat balance and energy management; and in which the controller receives and processes thermal information from temperature sensors located in the interior environment further comprising:

virtual representations of thermal emissivity and thermal mass of surfaces and objects in a building's interior environment, which virtual representations of thermal emissivity and thermal mass surfaces and objects in a building's interior environment and accessed by the controller for the purpose of determining radiative heat transfer within the environment due to solar insolation;

virtual representations of occupants and their behaviors, including where the occupants are likely to be located within a building's interior environments at any given time and date, and the occupants' personal heating preferences, which virtual representations of occupants and their behaviors are accessed by the controller for the purpose of calculating optimal output settings for controller command signals in order to maximize energy savings while maintaining selected occupant requirements for heating; and a fuzzy-logic inference engine that learns weather patterns and occupant usage patterns and preferences;

in which the controller maintains a mathematical model of sky conditions, historical weather data, and a database of weather patterns and occupant usage patterns and preferences, continually reads data from external input and communication devices, calculates the optimal settings for fenestration devices, and controls fenestration devices to achieve maximal energy savings while providing an interior thermal environment that is consistent with predefined goals and occupant preferences.

5. The predictive daylight harvesting system of claim 4, in which the controller communicates with other building automation systems and external systems, including electrical power utilities and smart power grids.

6. The predictive daylight harvesting system of claim 4, in which the controller continually reads data from external input and communication devices, calculates the optimal settings for luminaires and fenestration devices, and controls luminaires and fenestration devices to achieve maximal energy savings while providing an interior luminous environment that is consistent with predefined goals and occupant preferences.

7. The predictive daylight harvesting system of claim 4, further comprising multiple daylight photosensors, in which the controller combines outputs from the daylight photosensors to learn during a training period which weighting of outputs from different photosensors of the daylight photosensors more reliably predicts sky conditions.

8. The predictive daylight harvesting system of claim 4, further comprising:

at least one controller that reads input data from a variety of sensors and information feeds, and that includes an artificial intelligence engine;

at least one ambient condition sensor and at least one information feed; and an interconnect system operatively coupling the at least one controller to the sensor and the information feed;

configured to provide output data suitable for dimming or switching luminaires and operating automated fenestration devices.

* * * * *